US005510594A

United States Patent [19]

Mori et al.

[11] Patent Number: 5,510,594

[45] Date of Patent: Apr. 23, 1996

[54] METHOD OF MANUFACTURING THICK-FILM CIRCUIT COMPONENT

[75] Inventors: Hiroaki Mori; Masao Yonezawa, both of Kyoto, Japan

[73] Assignee: Murata Manufacturing Co., Ltd., Japan

[21] Appl. No.: 315,145

[22] Filed: Sep. 29, 1994

[30] Foreign Application Priority Data

Sep. 30, 1993 [JP] Japan .................................... 5-244505

[51] Int. Cl.$^{6}$ .................................................... B23K 26/00

[52] U.S. Cl. ................................ 219/121.69; 219/121.85; 219/541; 219/543; 338/195; 338/309

[58] Field of Search ......................... 219/121.68, 121.69, 219/121.85, 543, 548, 538, 541; 338/332, 313, 333, 307, 308, 272, 195, 309

[56] References Cited

U.S. PATENT DOCUMENTS 4,041,440 8/1977 Davis et al. ............................ 338/195
4,245,210 1/1981 Landry et al. .......................... 338/314
4,634,514 1/1987 Nishizawa et al. ..................... 204/406
4,894,258 1/1990 Belanger, Jr. ........................... 427/103
5,379,017 1/1995 Katsuno ................................. 338/332

*Primary Examiner*—Mark H. Paschall
*Attorney, Agent, or Firm*—Ostrolenk, Faber, Gerb & Soffen

[57] ABSTRACT

An electrode of a conductive material containing silver and a thick-film resistor of an electric resistive material containing cermet, which is electrically connected to the electrode, are formed on an electric insulating substrate by printing respectively. Then, the thick-film resistor is directly irradiated with a laser beam to be trimmed, and thereafter a protective film of an electric insulating material containing resin is formed on the insulating substrate by printing, to cover the electrode and the thick-film resistor.

15 Claims, 3 Drawing Sheets

METHOD OF MANUFACTURING THICK-FILM CIRCUIT COMPONENT

BACKGROUND OF THE INVENTION

1. Field of the Invention

The present invention relates to a method of manufacturing a thick-film circuit component, which comprises a thick-film resistor.

2. Description of the Background Art

Examples of a thick-film circuit component comprising a thick-film resistor are a hybrid IC, an R network and the like. Such a thick-film circuit component is manufactured through steps shown in FIGS. 5 to 9 respectively.

First, a substrate 11 of an electric insulating material such as alumina is prepared as shown in FIG. 5, to support electrodes 12 made of a conductive material containing silver such as Ag or an Ag—Pd alloy. The electrodes 12 are formed by applying paste containing the conductive material onto the insulating substrate 11 by printing and thereafter firing the same.

Then, a thick-film resistor 13 of an electrically resistive material containing cermet, such as ruthenium oxide, for example, is formed on the insulating substrate 11, as shown in FIG. 6. This thick-film resistor 13 is formed by applying paste containing the electrically resistive material onto the insulating substrate 11 by printing and thereafter firing the same.

Then, a protective film 14 is formed on the insulating substrate 11, to cover the electrodes 12 and the thick-film resistor 13, as shown in FIG. 7. This protective film 14 is formed by applying glaze onto the insulating substrate 11 by printing and thereafter firing the same.

Then, the thick-film resistor 13 is trimmed as shown in FIG. 8, to attain a desired resistance value. This trimming is carried out by irradiating the thick-film resistor 13 with a laser beam which is applied from above the protective film 14, so that a groove 15 is defined in the thick-film resistor 15.

Finally, a protective coating 16 of epoxy resin, for example, is formed to cover the overall insulating substrate 11, as shown in FIG. 9. This protective coating 16 is formed by dipping the overall insulating substrate 11 in liquid resin thereby applying the resin to cover the substrate 11, and thereafter solidifying this resin. Thus, a desired thick-film circuit component 17 is obtained.

In such a thick-film circuit component 17, additional electrodes and/or a necessary wiring pattern may be formed simultaneously with the electrodes 12 shown in the figures. Further, another thick-film resistor may also be formed simultaneously with the thick-film resistor 13 shown in the figures. In addition, one or a plurality of chip electronic components may be mounted on the insulating substrate 11.

In the thick-film circuit component 17 obtained in the aforementioned manner, the protective film 14 of glaze is formed in contact with the thick-film resistor 13, to cover this thick-film resistor 13. However, the protective film 14 of glaze is not so excellent in preventing migration of the silver contained in the electrodes 12. Therefore, the silver contained in the electrodes 12 may disadvantageously migrate through the protective film 14.

Further, the groove 15 which is defined by trimming of the thick-film resistor 13 extends not only through the thick-film resistor 13 but through the protective film 14, and hence the thick-film resistor 13 is partially exposed through this groove 15. This leads to reduction in moisture resistance of the thick-film circuit component 17. Although the protective coating 16 contributes some improvement in the moisture resistance, presence of the protective coating 16 hinders cost reduction or miniaturization of the thick-film circuit component 17.

SUMMARY OF THE INVENTION

Accordingly, the present invention provides a method of manufacturing a thick-film circuit component which is improved in preventing migration of silver contained in an electrode.

The present invention also provides a method of manufacturing a thick-film circuit component which facilitates cost reduction and miniaturization.

According to the present invention, a thick-film circuit component is manufactured through the following steps: An electrically insulating substrate is prepared so that an electrode of conductive material containing silver, and a thick-film resistor of an electrically resistive material containing cermet, which is electrically connected to the electrode, are formed on the insulating substrate by printing. In this stage, the thick-film resistor is directly irradiated with a laser beam, and trimmed by this irradiation. Thereafter, a protective film of an electric insulating material containing resin is formed on the insulating substrate by printing, to cover the electrode and the thick-film resistor.

The protective film of an electric insulating material containing resin which is formed according to the present invention does not readily transmit the silver contained in the electrode, thereby substantially of preventing migration of the silver.

Further, the protective film is formed only on a specific region of the insulating substrate by printing, whereby the formation area and the thickness thereof are not increased beyond necessity. In addition, the protective film, which is formed after the thick-film resistor is trimmed with the laser beam, is not removed by the laser beam. Thus, it is not necessary to form an additional protective coating on the protective film for the purpose of improving moisture resistance. Thus, it is possible to reduce the amount of protective material required for the thick-film circuit component, thereby reducing the cost for the thick-film circuit component while miniaturizing the same.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
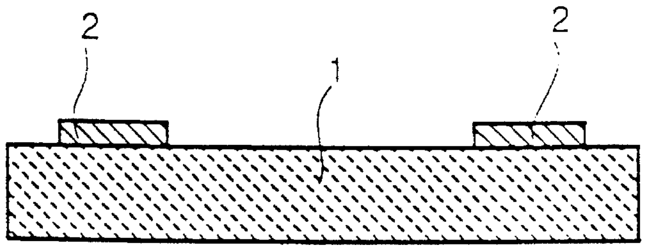
FIG. 1 is a sectional view of an insulating substrate showing an electrode forming step which is included in a method of manufacturing a thick-film circuit component according to an embodiment of the present invention.

As shown in FIG. 1, a substrate 1 of an electric insulating material such as alumina, for example, is prepared. Electrodes 2 of a conductive material containing silver such a Ag or a Ag—Pd alloy, for example, are formed on the insulating substrate 1. The electrodes 2 are formed by applying paste containing the conductive material onto the insulating substrate 1 by printing and thereafter firing the same.

Figure 2:
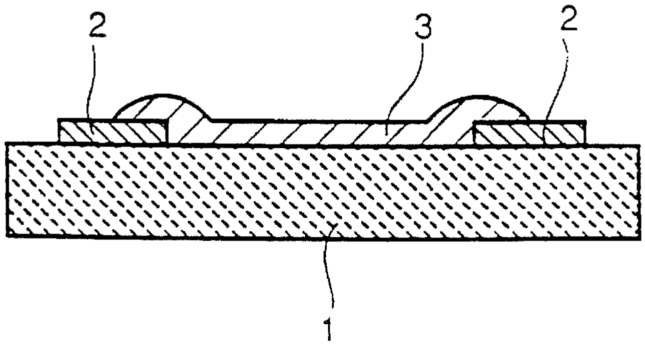
FIG. 2 is a sectional view of the insulating substrate showing a thick-film resistor forming step which is carried out after the electrode forming step shown in FIG. 1.

Then, a thick-film resistor 3 of an electrically resistive material containing cermet, such as ruthenium oxide, for example, is formed on the insulating substrate 1, to be electrically connected to the electrodes 2, as shown in FIG. 2. This thick-film resistor 3 is formed by applying paste containing the electrically resistive material onto the insulating substrate 1 by printing and thereafter firing the same.

While the electrodes 2 are formed at the start and the thick-film resistor 3 is thereafter formed to partially cover the same according to this embodiment, the thick-film resistor may alternatively be formed at the start so that the electrodes are thereafter formed to partially cover the same.

Figure 3:
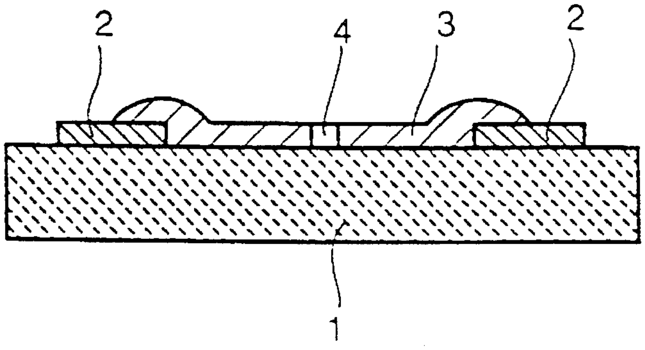
FIG. 3 is a sectional view of the insulating substrate showing a trimming step which is carried out after the thick-film resistor forming step shown in FIG. 2.

Then, the thick-film resistor 3 is directly irradiated with a laser beam so that the same is trimmed to attain a prescribed resistance value, as shown in FIG. 3. As the result of such trimming, a groove 4 is defined in the thick-film resistor 3.

Figure 4:
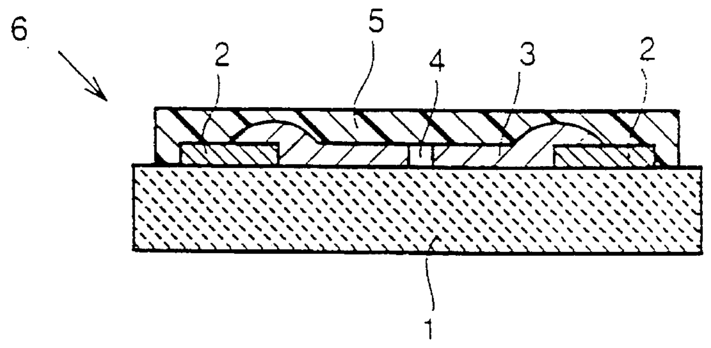
FIG. 4 is a sectional view of the insulating substrate showing a protective film forming step which is carried out after the trimming step shown in FIG. 3.
Figure 5:
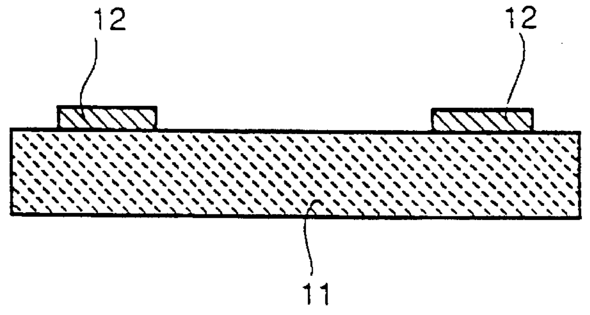
FIG. 5 PRIOR ART
FIG. 5 is a sectional view of an insulating substrate showing an electrode forming step which is included in a conventional method of manufacturing a thick-film circuit component.
Figure 6:
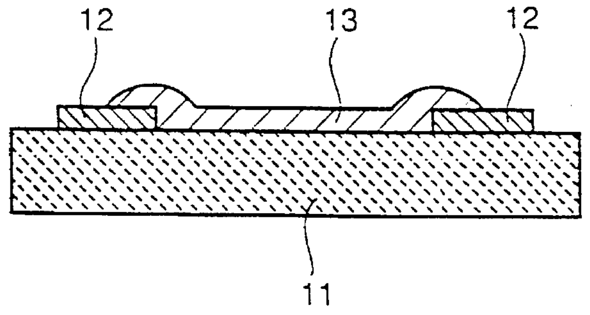
FIG. 6 PRIOR ART
FIG. 6 is a sectional view of the insulating substrate showing a thick-film resistor forming step which is carried out after the electrode forming step shown in FIG. 5.
Figure 7:
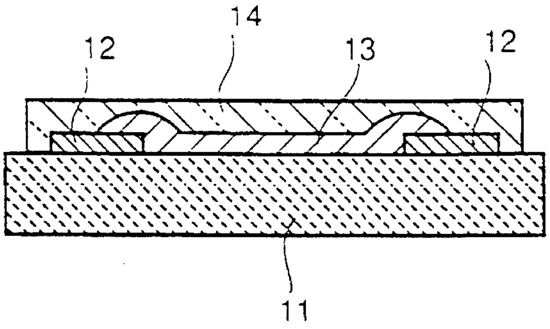
FIG. 7 PRIOR ART
FIG. 7 is a sectional view of the insulating substrate showing a protective film forming step which is carried out after the thick-film resistor forming step shown in FIG. 6.
Figure 8:
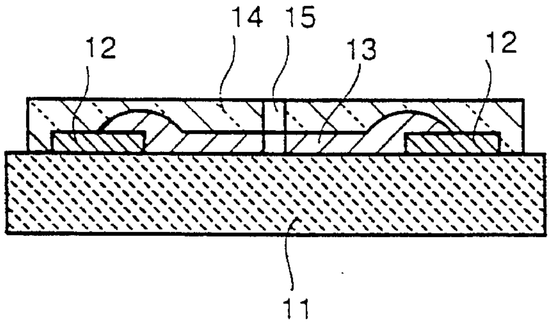
FIG. 8 PRIOR ART
FIG. 8 is a sectional view of the insulating substrate showing a trimming step which is carried out after the protective film forming step shown in FIG. 7.
Figure 9:
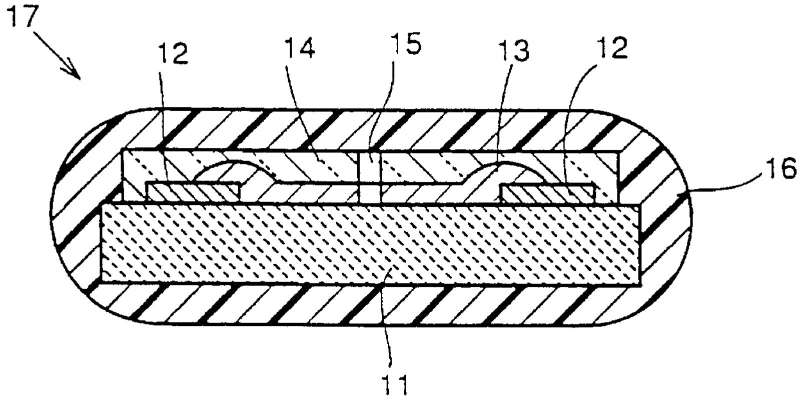
FIG. 9 PRIOR ART
FIG. 9 is a sectional view of the insulating substrate showing a protective coating forming step which is carried out after the trimming step shown in FIG. 8.

Finally, a protective film 5 of an electrically insulating material containing resin is formed on the insulating substrate 1 to cover the electrodes 2 and the thick-film resistor 3, as shown in FIG. 4. This protective film 5 is formed by applying paste containing the electrically insulating material onto the insulating substrate 1 by printing and thereafter-firing the same. The resin contained in the electrically insulating material is prepared from epoxy resin, phenol resin or epoxy phenol resin, for example.

Thus, a desired thick-film circuit component 6 is obtained.

In the aforementioned thick-film circuit component 6, additional electrodes and/or a wiring pattern (not shown) may be formed simultaneously with the electrodes 2. Further, another thick-film resistor may be formed simultaneously with the thick-film resistor 3 shown in the figures. The protective film 5 is formed to entirely cover the aforementioned electrodes, wiring pattern and thick-film resistors.

In the thick-film circuit component 6, further, one or a plurality of chip electronic components may be mounted on the insulating substrate 1. The chip electronic components are mounted after formation of the protective film 5. Therefore, the protective film 5 is formed in a state of exposing electrodes to be soldered with the chip electronic components. Further, lead terminals may be mounted on the insulating substrate 1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a thick-film circuit component, comprising the steps of:

preparing an electrically insulating substrate;

forming on said insulating substrate an electrode made of a conductive material containing silver;

forming on said insulating substrate a thick-film resistor made of an electrically resistive material containing cermet, said thick-film resistor being electrically connected to said electrode;

irradiating said thick-film resistor directly with a laser beam to trim said thick-film resistor; and forming a protective film made of an electrically insulating material containing resin on said insulating substrate after said irradiating step, said protective film being formed so as to cover said electrode and said thick-film resistor.

2. A method of manufacturing a thick-film circuit component in accordance with claim 1, wherein said step of forming said electrode includes the steps of applying paste containing said conductive material onto said insulating substrate by printing, and firing said electrode formed on said substrate.

3. A method of manufacturing a thick-film circuit component in accordance with claim 1, wherein said step of forming said thick-film resistor includes the steps of applying paste containing said electrically resistive material onto said insulating substrate by printing, and firing said thick-film resistor formed on said substrate.

4. A method of manufacturing a thick-film circuit component in accordance with claim 1, wherein said step of forming said protective film includes the steps of applying paste containing said electrically insulating material onto said insulating substrate by printing, and firing said protective film formed on said substrate.

5. A method of manufacturing a thick-film circuit component in accordance with claim 1, wherein said resin is selected from the group consisting of epoxy resin, phenol resin and epoxy phenol resin.

6. A method of manufacturing a thick-film circuit component in accordance with claim 1, further comprising the step of selecting said electrically insulating material such that said electrically insulating material prevents migration of silver from said electrode.

7. A thick-film circuit component manufactured in accordance with the method of claim 1.

8. A thick-film circuit component in accordance with claim 7, wherein said electrically insulating material prevents migration of silver from said electrode.

9. A thick-film circuit component in accordance with claim 7, wherein said protective film is formed using an amount of said electrically insulating material, said amount being limited to the least amount necessary to cover said electrode and said thick-film resistor.

10. A method of manufacturing a thick-film circuit component in accordance with claim 4, further comprising the step of determining a least amount of said electrically insulating material necessary to cover said electrode and said thick-film resistor, and forming said protective film using said determined amount of said electrically insulating material.

11. A method of manufacturing a thick-film circuit component, comprising the steps of:

preparing an electrically insulating substrate;

forming on said insulating substrate an electrode made of a conductive material containing silver, by applying paste containing said conductive material onto said insulating substrate by printing, and firing said electrode formed on said substrate;

forming on said insulating substrate a thick-film resistor made of an electrically resistive material containing cermet, said thick-film resistor being electrically connected to said electrode;

irradiating said thick-film resistor directly with a laser beam to trim said thick-film resistor;

forming a protective film made of an electrically insulating material containing resin on said insulating substrate after said irradiating step, said protective film being formed so as to cover said electrode and said thick-film resistor; and selecting said electrically insulating material such that said electrically insulating material prevents migration of silver from said electrode.

12. A method of manufacturing a thick-film circuit component in accordance with claim 11, wherein said resin is selected from the group consisting of epoxy resin, phenol resin and epoxy phenol resin.

13. A method of manufacturing a thick-film circuit component in accordance with claim 12, wherein said step of forming said thick-film resistor includes the steps of applying paste containing said electrically resistive material onto said insulating substrate by printing, and firing said thick-film resistor formed on said substrate.

14. A method of manufacturing a thick-film circuit component in accordance with claim 13, wherein said step of forming said protective film includes the steps of applying paste containing said electrically insulating material onto said insulating substrate by printing, and firing said protective film formed on said substrate.

15. A method of manufacturing a thick-film circuit component in accordance with claim 12, wherein said step of forming said protective film includes the steps of applying paste containing said electrically insulating material onto said insulating substrate by printing, and firing said protective film formed on said substrate.

* * * * *